United States Patent
Urban et al.

(10) Patent No.: US 10,819,424 B2
(45) Date of Patent: Oct. 27, 2020

(54) APPARATUS AND METHOD FOR MONITORING OPTICAL LINKS

(71) Applicant: TELEFONAKTIEBOLAGET LM ERICSSON (PUBL), Stockholm (SE)

(72) Inventors: Patryk Urban, Vällingby (SE); Diego Rodrigo Villafani Caballero, Rio de Janeiro (BR); Jean Pierre Von Der Weid, Rio de Janeiro (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/477,585

(22) PCT Filed: Dec. 13, 2017

(86) PCT No.: PCT/EP2017/082581
§ 371 (c)(1),
(2) Date: Jul. 12, 2019

(87) PCT Pub. No.: WO2018/130362
PCT Pub. Date: Jul. 19, 2018

(65) Prior Publication Data
US 2020/0136722 A1 Apr. 30, 2020

Related U.S. Application Data

(60) Provisional application No. 62/446,005, filed on Jan. 13, 2017.

(51) Int. Cl.
*H04B 10/077* (2013.01)
*H04B 10/071* (2013.01)
*H04B 10/40* (2013.01)

(52) U.S. Cl.
CPC ....... *H04B 10/0779* (2013.01); *H04B 10/071* (2013.01); *H04B 10/40* (2013.01)

(58) Field of Classification Search
CPC ... H04B 10/0779; H04B 10/071; H04B 10/40
USPC .......................................................... 398/16
See application file for complete search history.

(56) References Cited

U.S. PATENT DOCUMENTS

| 7,042,559 B1 * | 5/2006 | Frigo ................ G01M 11/3127 356/73.1 |
| 7,493,040 B1 | 2/2009 | Schofield et al. |
| 2014/0016926 A1 * | 1/2014 | Soto .................... H04J 14/0252 398/16 |

(Continued)

OTHER PUBLICATIONS

D. Villafani Caballero et al., "SCM/WDM-PON with in-service baseband embedded OTDR monitoring", Optics Communications, 2015, vol. 356, pp. 250-255.

(Continued)

*Primary Examiner* — Dalzid E Singh
(74) *Attorney, Agent, or Firm* — Patent Portfolio Builders PLLC

(57) ABSTRACT

A method in a transceiver apparatus for monitoring an optical link over which one or more data signals are to be transmitted comprises time interleaving a test signal with an auxiliary management and control channel, AMCC, signal to form a time-interleaved signal. The time-interleaved signal is transmitted with one or more downstream data signals over the optical link. A backscattered test signal is received to monitor the optical link.

22 Claims, 4 Drawing Sheets

101 — Time interleave a test signal with an auxiliary management and control channel, AMCC, signal to form a time-interleaved signal 103 — Transmit the time-interleaved signal with one or more downstream data signals over an optical link 105 — Receive a backscattered test signal to monitor the optical link

(56) References Cited

U.S. PATENT DOCUMENTS

| | | | | |
|---|---|---|---|---|
| 2017/0111137 | A1* | 4/2017 | Gao | H04B 10/27 |
| 2018/0123687 | A1* | 5/2018 | Chang | H04B 10/0771 |
| 2019/0165865 | A1* | 5/2019 | Nakagawa | H04J 14/0276 |

OTHER PUBLICATIONS

Goji Nakagawa et al., "Experimental Investigation of AMCC Superimposition Impact on CPRI Signal Transmission in DWDM-PON Network", ECOC 2016, 42nd European Conference and Exhibition on Optical Communications, Sep. 18-22, 2016, pp. 989-991.

Gustavo C. Amaral et al., "A Low-Frequency Tone Sweep Method for In-Service Fault Location in Subcarrier Multiplexed Optical Fiber Networks", Journal of Lightwave Technology, May 15, 2017, vol. 35, No. 10, pp. 2017-2025.

Gustavo C. Amaral et al., "Automatic Fault Detection in WDM-PON With Tunable Photon Counting OTDR", Journal of Lightwave Technology, Dec. 15, 2015, vol. 33, No. 24, pp. 5025-5031.

International Telecommunication Union, "ITU-T Telecommunication Standardization Sector of ITU, G.989.2, Amendment 1, Series G: Transmission Systems and Media, Digital Systems and Networks, Digital sections and digital line system—Optical line systems for local and access networks, 40-Gigabit-capable passive optical networks 2 (NG-PON2): Physical media dependent (PMD) layer specification, Amendment 1", Apr. 2016.

International Telecommunication Union, "ITU-T Telecommunication Standardization Sector of ITU, G.989.3, Series G: Transmission Systems and Media, Digital Systems and Networks, Digital sections and digital line system—Optical line systems for local and access networks, 40-Gigabit-capable passive optical networks (NG-PON2): Transmission convergence layer specification", Oct. 2015.

International Telecommunication Union, "ITU-T Telecommunication Standardization Sector of ITU, L.25, Series L: Construction, Installation and Protection of Cables and Other Elements of Outside Plant, Optical fibre cable network maintenance", Jan. 2015.

International Telecommunication Union, "ITU-T, Telecommunication Standardization Sector of ITU, Series G, Supplement 55, Series G: Transmission Systems and Media, Digital Systems and Networks, Radio-over-fibre (RoF) technologies and their applications", Jul. 2015.

John E. Mitchell, "Integrated Wireless Backhaul over Optical Access Networks", IEEE, 2013, pp. 305-308.

Jorg Hehmann et al., "New Monitoring Concepts for Optical Access Networks", Bell Labs Technical Journal, 2008, vol. 13, No. 1, pp. 183-198.

Kivilcim Yuksel et al., "Optical Layer Monitoring in Passive Optical Networks (PONs): A Review", ICTON 2008, pp. 92-98.

Luca Giorgi et al., "Subcarrier Multiplexing RF Plans for Analog Radio Over Fiber in Heterogeneous Networks", Journal of Lightwave Technology, Aug. 15, 2016, vol. 34, No. 16, pp. 3859-3866.

Lumentum, "BrightJack Continuous Fiber Monitoring for Fiber-to-the-Antenna (FTTA)", www.lumentum.com, 2015, pp. 1-3.

NGMN Alliance, "Fronthaul Requirements for C-RAN", Version 1.0, Mar. 31, 2015, pp. 1-10.

NGMN, "Access Link Monitoring", ADVA Optical Networking, www.advaoptical.com, Feb. 2015, pp. 1-6.

Patryk J. Urban et al., "Fiber monitoring Using a Sub-Carrier Band in a Sub-Carrier Multiplexed Radio-Over-Fiber Transmission System for Applications in Analog Mobile Fronthaul", Journal of Lightwave Technology, Jul. 1, 2016, vol. 34, No. 13, pp. 3118-3125.

Patryk J. Urban et al., "Fiber Plant Manager: An OTDR- and OTM-Based PON Monitoring System", IEEE Communications Magazine, Feb. 2013, pp. S9-S15.

Philippe Chanclou et al., "Optical Fiber Solution for Mobile Fronthaul to Achieve Cloud Radio Access Network", Future Network & Mobile Summit 2013, pp. 1-11.

Satoshi Yoshima et al., "Experimental Investigation of an Optically-superimposed AMCC in 100 Gb/s Coherent WDM-PON for 5G Mobile Fronthaul", ECOC 2016, 42nd European Conference and Exhibition on Optical Communications, Sep. 18-22, 2016, pp. 986-988.

Transmode, "Mobile Fronthaul", www.transmode.com, pp. 1-7.

Zakaria Tayq et al., "Experimental Real Time AMCC Implementation for Fronthaul in PtP WDM-PON", ECOC 2016, 42nd European Conference and Exhibition on Optical Communications, Sep. 18-22, 2-16, pp. 995-997.

International Search Report and Written Opinion, dated Apr. 23, 2018, from corresponding/related International Application No. PCT/EP2017/082581.

P.J. Urban et al., "Detection of Fiber Faults in Passive Optical Networks", J. Opt. Commun. Netw., Nov. 2013, vol. 5, No. 11, pp. 1-11.

* cited by examiner

APPARATUS AND METHOD FOR MONITORING OPTICAL LINKS

TECHNICAL FIELD

The embodiments described herein relate to an apparatus and method for monitoring optical links, and in particular an apparatus and method for monitoring an optical link forming part, for example, of a mobile fronthaul system, for example an analog mobile fronthaul (a-MFH) system.

BACKGROUND

The Radio Access Network (RAN) needs to evolve to meet future communication requirements. One of the development directions is the future Radio Base Station (RBS) architecture, and the splitting of functions in such an architecture. However, the last part of the wireline connectivity to a simple antenna unit is analog and, in the context of collocating important and expensive RAN resources, such an analog wireline link may need to be extended to several kilometers in length. The analog wireline link may also be referred to as an analog mobile fronthaul, a-MFH. Analog mobile fronthaul is being supported by the development of new fiber-based transport technologies, with strong emphasis being placed on improving reach, bandwidth efficiency and link reliability. With respect to the latter, i.e. link reliability, the ability to efficiently monitor a physical link is becoming an important aspect. Monitoring link reliability should provide in-service rapid and detailed link evaluation while imposing minor additional costs and preserving high data signal quality. In contrast to baseband transmission, where link monitoring possibilities have been extensively studied, less work has been carried out in analog Radio over Fiber (a-RoF) transmission.

Reliability requirements for mobile fronthaul solutions should provide backup mechanisms in the case of fiber failure with a redundancy switching time of less than 50 ms, which is preferable to help avoid service interruption at the application-layer due to the link failure. Such reliability requirements can be enabled by preventative in-service fiber monitoring, which can support the rapid detection of sudden faults and fault projection due to progressive link degradation. Such monitoring is desirable because end-to-end monitoring on higher protocol layers (e.g. Bit-Error Rate, BER, monitoring), although ubiquitous in metro and access transmission systems, is not sufficient for the desired network reliability, due to its post-fault (i.e. reactive) operation.

Fiber MFH is considered as a new access technology based on Passive Optical Networks, PONs. However, the subject of link monitoring in this case is in its infancy when compared with the well-studied fixed access-oriented PON monitoring.

There are many published works with a good overview of proposed monitoring techniques for links with digital data transmission such as those based on: Optical Time Domain Reflectometer (OTDR) and Optical Transceiver Monitoring (OTM) or reflectors, tunable OTDR with wavelength-specific reflectors, utilization of backscattered downstream data signal, Brillouin scattering-based OTDR, Optical Frequency Domain Reflectometry (OFDR), Photon Counting OTDR (PC-OTDR), optical coding, and more.

However, while potential operational expenditure (OPEX) savings resulting from the application of those techniques are appealing to network operators, the related high cost of such concepts is often discouraging for solution vendors to adopt them and commercialize. Therefore, vendors and operators tend to relax their requirements and lean towards simpler yet reliable approaches for fixed optical access networks and digital mobile fronthaul, d-MFH, for example: test signal reflectometry and transmit/receive power measurement techniques.

Analog data transmission over a-MFH is more susceptible to transmission impairments. Thus, stricter requirements are imposed for monitoring solutions with regards to the potential impact of the test signal onto the analog data signal, which could happen, for example, due to the high power of the test signal and resulting inter-channel crosstalk, nonlinearities or noise.

Intuitively, from a data signal quality point of view, some of the above mentioned techniques, especially those which dedicate a separate wavelength for monitoring, could be potentially applied to a-MFH. On the other hand, for cost-efficiency reasons, a preference would be given to solutions that could be integrated with data transmission in the same transceiver.

SUMMARY

It is an aim of the present invention to provide a method and apparatus which obviate or reduce at least one or more of the disadvantages mentioned above.

According to a first aspect there is provided a method in a transceiver apparatus for monitoring an optical link over which one or more data signals are to be transmitted. The method comprises time interleaving a test signal with an auxiliary management and control channel, AMCC, signal to form a time-interleaved signal. The method comprises transmitting the time-interleaved signal with one or more downstream data signals over the optical link, and receiving a backscattered test signal to monitor the optical link.

According to another aspect there is provided a transceiver apparatus for monitoring an optical link over which one or more data signals are to be transmitted. The transceiver apparatus comprises a time interleaving module for time interleaving a test signal with an auxiliary management and control channel, AMCC, signal to form a time-interleaved signal. The transceiver apparatus comprises a transmitting module for transmitting the time-interleaved signal with one or more downstream data signals over the optical link. The transceiver apparatus comprises a receiving module for receiving a backscattered test signal to monitor the optical link.

BRIEF DESCRIPTION OF THE DRAWINGS

For a better understanding of examples of the embodiments described herein, and to show more clearly how the examples may be carried into effect, reference will now be made, by way of example only, to the following drawings in which.

DETAILED DESCRIPTION

The following sets forth specific details, such as particular embodiments for purposes of explanation and not limitation.

But it will be appreciated by one skilled in the art that other embodiments may be employed apart from these specific details. In some instances, detailed descriptions of well known methods, interfaces, circuits, signals and devices are omitted so as not to obscure the description with unnecessary detail.

Lately, much attention has been given to the combination of Sub-Carrier Multiplexing (SCM) and Radio over Fiber, RoF, i.e., converting the RF carrier to an Intermediate Frequency (IF over Fiber, IFoF). For example, IFoF and Wavelength Division Multiplexing (WDM) is one option for optical interconnections of a few kilometers in length, as this option can tackle the problem of minimizing the number of optical fibers and the number of expensive optical components. It can also reduce the footprint in a Central Office (CO), simplify cable and fault management, and, in turn, reduce operational costs.

Work is also being undertaken on a transparent Auxiliary Management and Control Channel (transparent AMCC) for application in the next generation of passive optical networks, i.e. PON 2, as explained for example in a recommendation entitled "40-Gigabit-capable passive optical networks (NG-PON2): Transmission convergence layer specification", G.989.3, International Telecommunication Union, October 2015, and a recommendation entitled "40-Gigabit-capable Passive Optical Networks 2 (NG-PON2): Physical media dependent (PMD) Layer Specification", G.989.2 Amendment 1, International Telecommunication Union, April 2016. Use of an AMCC has also been proven feasible for various proposed digital fronthaul solutions. In addition, the AMCC can be also adopted to the Radio-over-fiber technologies, G.RoF, since the new access technology is expected to leverage on legacy PON technologies.

The transparent AMCC, which is mandatory in the point-to-point (PtP) WDM-PON overlay for activation and control of PtP WDM channels, can be implemented through Baseband Over-modulation (BB Over-modulation) or RF pilot tone. For example, 10% of the modulation index can be used to transmit a 115 kb/s Non-Return-to-Zero (NRZ) signal superimposed to the amplitude modulation of the payload bitstream. In another example, a 128 kb/s NRZ AMCC signal on a 500 kHz carrier is added to the payload bitstream in the electrical domain.

The embodiments described below provide a test signal which can be used to monitor an optical link, for example to detect a link reliability, link failure, link degradation, and so forth.

Figure 1:
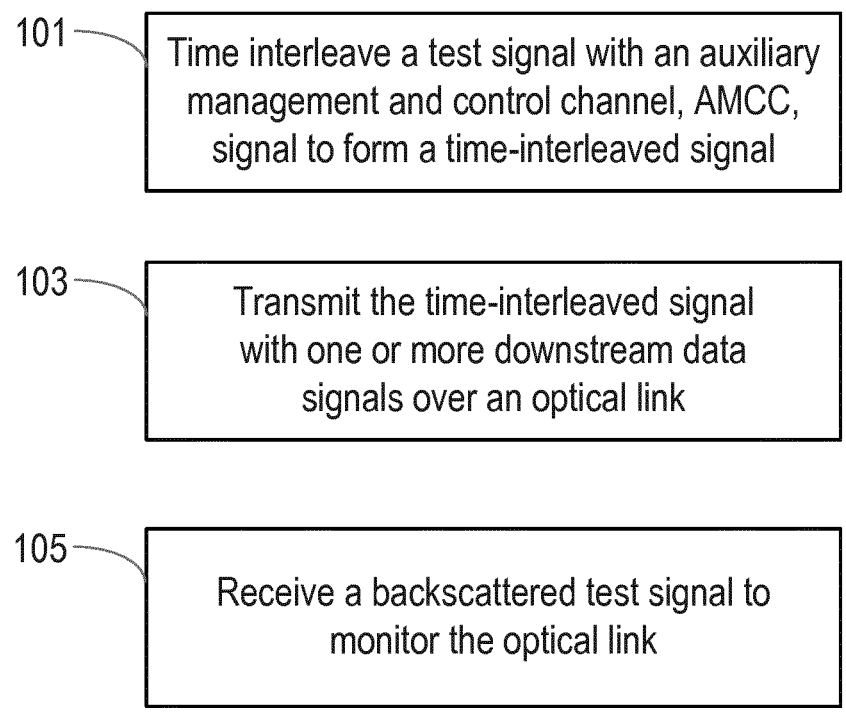
FIG. 1 shows an example of a method according to a first embodiment.

FIG. 1 shows a method in a transceiver apparatus according to an embodiment, for monitoring an optical link over which one or more data signals are to be transmitted. The optical link may comprise, for example, an optical fiber, for example forming part of a mobile fronthaul system, for example part of an analog mobile fronthaul, a-MFH. Although the embodiments described herein will be made in the context of a-MFH as an example of the optical link to be monitored, it is noted that the embodiments may also be used with digital mobile fronthaul, d-MFH.

The method comprises time interleaving a test signal with an auxiliary management and control channel, AMCC, signal to form a time-interleaved signal, step 101. The method comprises transmitting the time-interleaved signal with one or more downstream data signals over the optical link, step 103. The method comprises receiving a backscattered test signal to monitor the optical link, step 105.

By time-interleaving the test signal with an AMCC signal, such a method enables three major functionalities to be provided in one transceiver apparatus, these being: 1) data transmission, for example for a-MFH over fiber (including in some examples bidirectional data transmission); 2) AMCC, and; 3) line monitoring. It is noted that further details of the AMCC signal per se may be found in the ITU recommendations mentioned earlier.

Furthermore, by including the line monitoring function through time-interleaving (or time slotting) with an AMCC signal (e.g. in different ways as will be explained further below) and using, for example, a low-modulation index to impose this combined signal on a single optical carrier carrying downstream data, this enables the line monitoring function to be combined with actual data transmission, and without degrading the data transmission per se.

According to one embodiment, the test signal comprises optical time domain reflectometer, OTDR, pulses. Such OTDR pulses are designed so that they are intended to be backscattered by the optical link over which they are transmitted. To assist with the interpretation of the backscattered test signal and obtain sensible line quality measurements, it is noted that adjustments may be made to the time-length, amplitude and frequency of the pulses, for example to best suit a particular optical link being monitored.

In such an embodiment, the method comprises time division multiplexing the test signal with the AMCC signal to form the time-interleaved signal.

Figure 2:
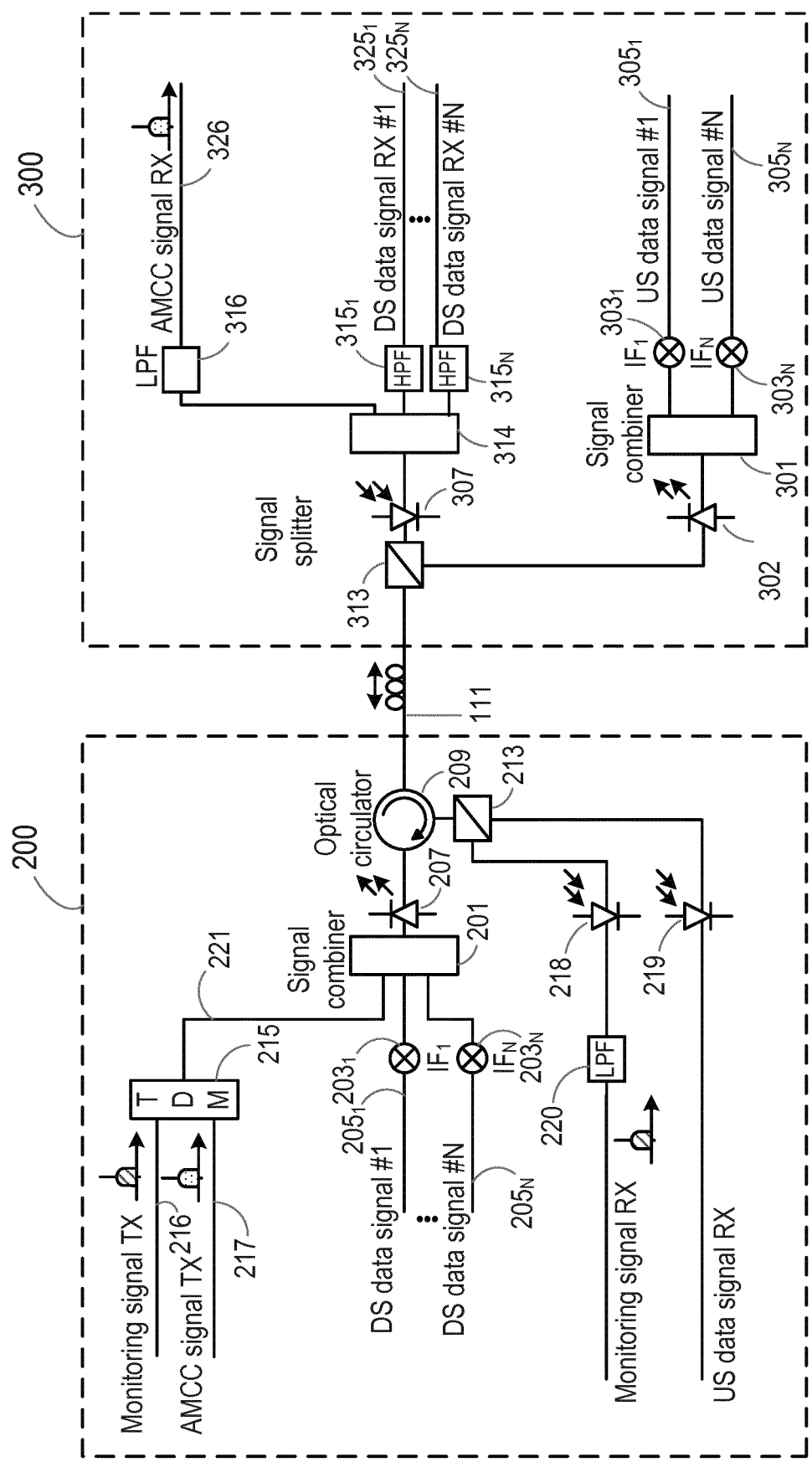
FIG. 2 shows an example of a transceiver apparatus according to an embodiment.

FIG. 2 shows an example of how the method may be performed in a transceiver apparatus 200 forming part of a communication network. In particular, FIG. 2 shows an example of an embodiment in which the time-interleaved signal comprises time-slotted baseband OTDR pulses and an AMCC bitstream.

The transceiver apparatus 200 comprises a signal combiner 201 for receiving one or more downstream data signals $205_1$ to $205_N$ which are to be transmitted downstream over an optical link 111 to another transceiver apparatus 300. The optical link 111 may comprise an optical fiber, for example forming part of an a-MFH. In this example one or more mixers $203_1$ to $203_N$ are provided for converting the downstream data signals $205_1$ to $205_N$ from baseband to intermediate frequency, IF, signals.

The transceiver apparatus 200 comprises a time division multiplexing module 215 that is adapted for time-interleaving the test signal 216 (monitoring signal) with an AMCC signal 217. In particular, the time division multiplexing module 215 is adapted to time division multiplex the AMCC signal 217 with the test signal 216 to form a time-interleaved signal 221.

As mentioned above, in this example the test signal 216 comprises baseband, BB, OTDR Pulses. The transceiver apparatus 200 may therefore comprise an OTDR pulse generator (not shown) for generating such pulses. For example, in a baseband approach one could achieve ⅟115 kb/s, which is equivalent to about 8.7 μs pulses, which corresponds to about 870 m of OTDR distance measurement resolution using the AMCC signal bandwidth (for example AMCC bandwidth of about 250 kHz).

In one example, the time division multiplexing comprises time interleaving single OTDR pulses with the AMCC signal. For example, a single bit of a 115 kb/s test signal, i.e. a pulse of about 8.7 μs. However, during a single bit of the 115 kb/s transmission, the optical link could be tested with even higher resolution if needed, for example using a 100 ns bit (which provides a 10 m resolution). A resolution of 10 m means that, if there would be two faults spaced less than 10 m apart, they would be recorded as a single fault. This is feasible if the larger spectrum of the test signal i.e. 10 MHz in such a scenario, is still acceptable from the data transmission view point, i.e. does not unduly affect the quality of the data transmission.

In another example, the time division multiplexing comprises time interleaving a plurality of OTDR pulses with the AMCC signal. For example, to improve Signal-to-Noise Ratio, SNR, several bits of the test signal can be used for testing.

Thus, in some examples several bits, i.e. pulses, are provided in each time-interleaved slot between AMCC bits, while in other examples separate single pulses are provided in each time-interleaved slot between AMCC bits.

In another example, the time division multiplexing comprises time interleaving a coded bit sequence of OTDR pulses with the AMCC signal. For example, sensitivity can be improved by using coded OTDR i.e., sending a bit sequence as a test signal instead of a single pulse.

The signal combiner 201 is adapted to combine the time-interleaved signal 221 received from the time division multiplexing module 215 with the one or more downstream data signals $205_1$ to $205_N$ that have been converted to IF, and that are to be transmitted over the optical link 111. The signal combiner 201 may comprise a passive signal combiner having no advanced logic function. It is noted that, although the signal combiner 201 is shown as a signal combiner having multiple input ports for receiving the time-interleaved signal 221 and one or more data signals $205_1$ to $205_N$, the signal combiner 201 may instead comprise a cascade of different order signal combiners, for example whereby a first order signal combiner combines one or more data signals, with a second order signal combiner combining those combined data signals with the time-interleaved signal. The signal combiner 201 simply combines the input signals into an output port. The embodiments may be used with various configurations of combiners. For example, a 2:1 signal combiner has two input ports and one output port. A 2:2 signal combiner has two input ports and two output port, whereby the output ports may contain the same signals which comprise e.g. 50% of each input signal in terms of power.

A light source 207, for example comprising a single laser, is provided for transmitting the combined signal from the signal combiner 201 over the optical link 111, e.g. via an optical circulator 209. As will be familiar to a person skilled in the art, an optical circulator 209 is a passive component that is used to direct an optical signal from one port to another and in one direction only, to prevent the signal from propagating in an unintended direction.

From the above it can be seen that the time-interleaved signal 221 comprising the test signal 216 and AMCC signal 217 is a baseband signal, and wherein the one or more downstream data signals $205_1$ to $205_N$ are intermediate frequency signals.

The transceiver apparatus 200 comprises a demultiplexing module 213 for receiving upstream data signals, e.g. from another transceiver apparatus 300 coupled to a remote end of the optical link 111. The demultiplexing module 213 also receives backscattered test signals from the optical link 111, and is adapted to demultiplex the backscattered test signals from the upstream data signals.

A first photo-detector 219 is provided to detect one or more upstream data signals which have been received over the optical link 111 and demultiplexed by the demultiplexing module 213.

The transceiver apparatus 200 further comprises a second photo-detector 218 for detecting the backscattered test signals, i.e. which have been backscattered as a result of being transmitted over the optical link as described above, and received and demultiplexed by the demultiplexing module 213. The second photo-detector 213 may be time gated, for example to correspond with the timing used to time interleave the test signal with the AMCC signal in the first place.

A low pass filter, LPF, 220 may be provided after the second photo-detector 218, i.e. after the photodetector that should receive the backscattered test signals, the LPF 220 adapted to block the backscattered data signals on higher frequencies and let through only backscattered signals relating to the time-interleaved AMCC/test signal which needs to be demultiplexed.

Thus, the additional photo-detector 218 enables a line testing signal that has been backscattered/back-reflected to be processed, for example to perform Single End Line Testing, SELT.

As can be seen from above, the transmission of the time-interleaved test/AMCC signal requires rather minor changes on the electronic side of the transceiver apparatus with respect to an AMCC-enabled transceiver, i.e. requires a time division multiplexing module 215 to interleave the test signal and AMCC signal, and a second photo-detector 218 for detecting the backscattered test signals (and in some examples a LPF 220).

FIG. 2 also shows an example of a transceiver apparatus 300 coupled to a remote end of the optical link 111, and how a transceiver apparatus may be adapted to cope with receiving an AMCC signal which has been time-interleaved with a test signal.

The transceiver apparatus 300 comprises a receiving node 313 for receiving the combined signal from the signal combiner 201 of the transmitter side. The time-interleaved signal (that comprises the AMCC signal and the test signal, or at least the remnants of the test signal which have not been backscattered as described above) is received, for example, by the same photo-detector 307 that is provided for detecting the combined one or more downstream data signals.

The transceiver apparatus 300 comprises a signal splitter 314 that is coupled to receive an output of the photo-detector 307, and split the one or more data signals from the time-interleaved signal, to provide the one or more downstream data signals $325_1$ to $325_N$. In the example of FIG. 2 the data signals are high pass filtered after the signal splitter 314, using high pass filters $315_1$ to $315_N$.

The example of FIG. 2 shows the transceiver apparatus 300 comprising a low pass filter, LPF, 316 for filtering the AMCC signal received by the transceiver to provide a low pass filtered AMCC signal 326. An extraction unit (not shown), for example a time division demultiplexing module, may be provided for extracting or removing the AMCC signal from the time-interleaved signal received at the transceiver apparatus 300. Such an extraction unit may be provided before or after the low pass filter 316. In this way the transceiver apparatus 300 is able to receive the AMCC signal, and process the AMCC signal in a normal way.

The transceiver apparatus 300 further comprises a signal combiner 301 that is adapted to combine one or more data signals $305_1$ to $305_N$ that are to be transmitted over the optical link 111, which are intended to be received as upstream data signals by the first transceiver apparatus 200. In this example one or more mixers $303_1$ to $303_N$ are provided for converting the upstream data signals from baseband to intermediate frequency, IF, signals. A light source 302, for example comprising a single laser, is provided for transmitting the combined signal from the signal combiner 301 over the optical link 111. In this example the second transceiver apparatus 300 is not shown as transmitting an AMCC signal. It is noted, however, that the second transceiver apparatus 300 may be adapted to transmit such an AMCC signal, in a similar way to the first transceiver apparatus 200, in which case the signal combiner 301 of the second transceiver apparatus 300 may be adapted to also combine the AMCC signal with the upstream data signals $305_1$ to $305_N$.

In a similar way, although FIG. 2 does not show how the first transceiver apparatus 200 receives AMCC signals from other transceivers, the first transceiver apparatus 200 may also comprise circuitry similar to the second transceiver apparatus 300, for extracting a received AMCC signal from a time-interleaved signal comprising a test signal and the AMCC signal. Such an embodiment would enable the optical link to be tested from both sides, which could provide additional information about the line under test.

Figure 3:
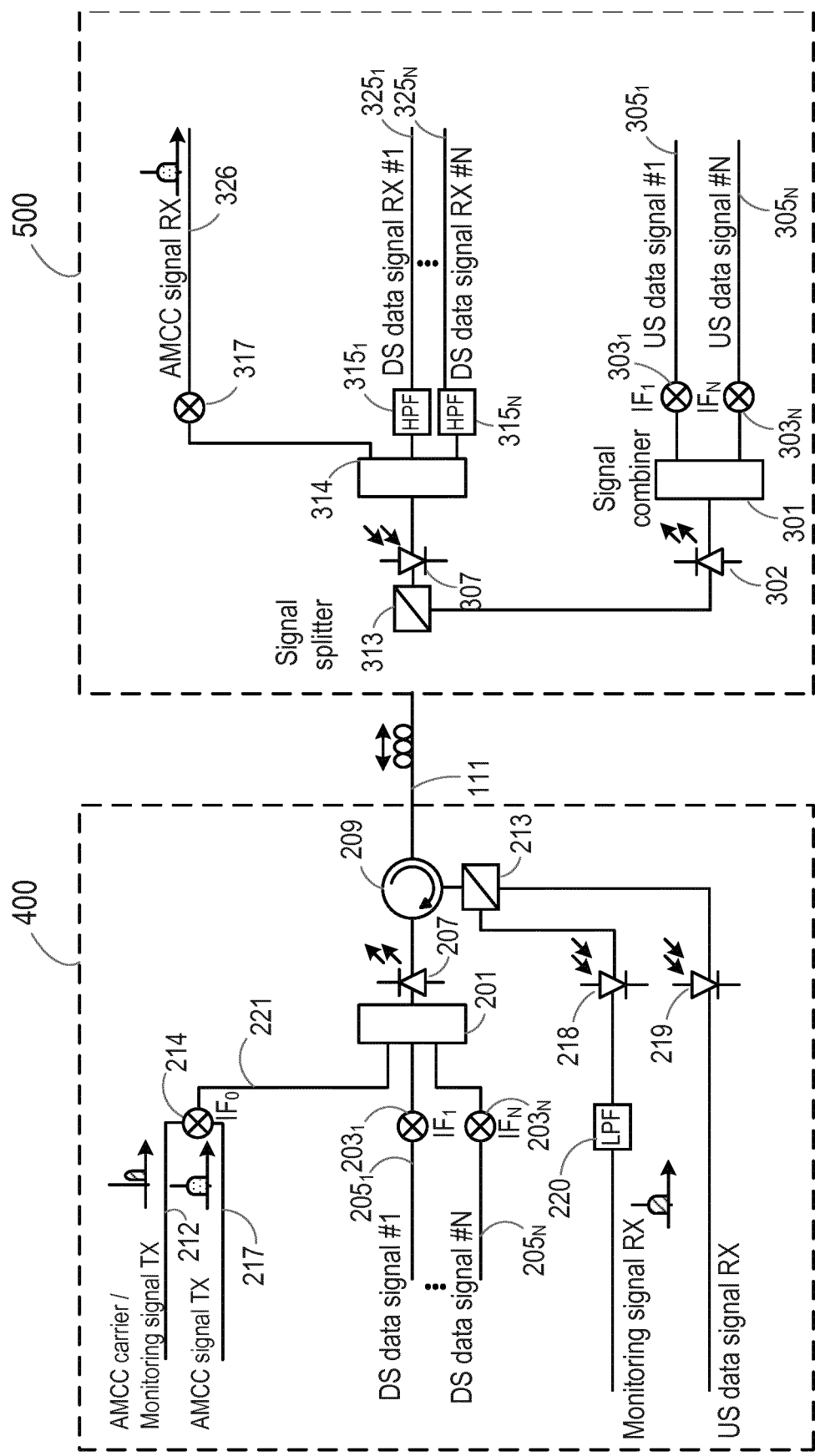
FIG. 3 shows an example of a transceiver apparatus according to another embodiment.

FIG. 3 shows an example according to another embodiment, in which the test signal comprises an optical frequency domain reflectometer, OFDR, signal.

The transceiver apparatus 400 comprises a signal combiner 201 for receiving one or more downstream data signal $205_1$ to $205_N$ which are to be transmitted downstream over the optical link 111 to another transceiver apparatus 300. The optical link 111 may comprise an optical fiber, for example forming part of an a-MFH. One or more mixers $203_1$ to $203_N$ are provided for converting the downstream data signals $205_1$ to $205_N$ from baseband to intermediate frequency, IF signals.

The transceiver apparatus comprises a further mixer 214 for mixing an AMCC carrier signal 212 with an AMCC signal 217. As will be explained later, the output of the mixer provides a time-interleaved signal 221 comprising the AMCC signal and a test signal, depending upon whether the AMCC carrier signal 212 is kept fixed (as per an AMCC mode of operation) or frequency swept (as per a test signal mode of operation).

The signal combiner 201 is adapted to combine the time-interleaved signal 221 received from the mixer 214 with the one or more downstream data signals $205_1$ to $205_N$ that have been converted to IF, and that are to be transmitted over the optical link 111. As with the embodiment of FIG. 2, the signal combiner 201 may comprise a passive signal combiner having no advanced logic function. It is noted that, although the signal combiner 201 is shown as a signal combiner having multiple input ports for receiving the time-interleaved signal and one or more data signals $205_1$ to $205_N$, the signal combiner 201 may instead comprise a cascade of different order signal combiners, for example whereby a first order signal combiner combines one or more data signals, with a second order signal combiner combining those combined data signals with the time-interleaved signal. As with FIG. 2, the signal combiner 201 simply combines the input signals into an output port. The embodiments may be used with various configurations of combiners.

A light source 207, for example comprising a single laser, is provided for transmitting the combined signal from the signal combiner 201 over the optical link 111, e.g. via an optical circulator 209. As will be familiar to a person skilled in the art, an optical circulator 209 is a passive component that is used to direct an optical signal from one port to another and in one direction only, to prevent the signal from propagating in an unintended direction.

In this embodiment, the test signal is generated by frequency sweeping the carrier signal 212 of the AMCC signal 217 between a first frequency and a second frequency, to generate the OFDR test signal. In some examples the frequency of the OFDR signal corresponds to the center frequency of the carrier signal 212 of the AMCC signal 217. Thus, in this case the test signal is a frequency-swept tone. This has an advantage that a local oscillator used to generate the carrier frequency 212, e.g. 500 kHz, of the AMCC signal 217 may also be used the generate the test signal, e.g. if the local oscillator is a tunable local oscillator which is controlled to provide the sweeping frequency signal. The test signal may be frequency swept, for example, within the frequency range used for the AMCC signal.

The time-interleaving aspect of this embodiment is obtained by halting transmission of the AMCC signal 217 while the OFDR signal is being frequency swept to generate the test signal, and in some aspects, vice versa. As such, at any moment in time the output of the mixer 214 is either outputting an IF signal corresponding to the AMCC signal 217 modulated at its carrier frequency 212, for example a carrier frequency fixed at 500 kHz, or outputting the test signal comprising the carrier signal 212 of the AMCC signal which is being swept between the first frequency and the second frequency.

According to this embodiment the AMCC bitstream is therefore transmitted only when the carrier frequency is set or fixed (e.g. to 500 kHz) and the AMCC transmission is stopped (e.g. buffered) when the frequency of the carrier signal 212 is being swept to generate the test signal, i.e. for line monitoring purposes.

If the bandwidth of the AMCC signal 217 is about 250 kHz, for example, this would allow for a maximum tone sweep from a first frequency of about 375 kHz to a second frequency of about 625 kHz. This can provide a resolution of 5 m for distance measurements. A resolution of 5 m means that, if there would be two faults spaced less than 5 m apart, they would be recorded as a single fault.

It is noted that although the test signal is described above as being the frequency sweep of the carrier signal 212 corresponding to the AMCC signal 217, in other embodiments the test signal may comprise a frequency sweep about a different center frequency, non-related to that of the AMCC signal.

The AMCC data transmission can be gated in order to eliminate its contribution to the in-band backscattered power. The full 250 kHz tone sweep demands minute time sweeps but each data point can be obtained within e.g. one time-slot. The full spectrum can be obtained by multiple data acquisitions each one time multiplexed with AMCC data transmission using a few time-slots for each point. This may comprise, for example: (1) using one particular frequency (f_1) during one time slot (t_1) dedicated for monitoring mode operation, (2) using another frequency (f_i) during time slot (t_i), and (3) repeating this until (f_max) and (t_max), wherein (f_1) to (f_max) is the complete frequency sweep between first and second frequencies.

From FIG. 3 it can be seen that the time-interleaved signal and the one or more downstream data signals $205_1$ to $205_N$ are all intermediate frequency signals.

The transceiver apparatus 400 comprises a demultiplexing module 213 for receiving upstream data signals, e.g. from another transceiver apparatus 500 coupled to a remote end of the optical link 111. The demultiplexing module 213 also receives backscattered test signals from the optical link, and is adapted to demultiplex the backscattered test signal from the upstream data signals.

A first photo-detector 219 is provided to detect one or more upstream data signals which have been received over the optical link 111 and demultiplexed by the demultiplexing module 213.

The transceiver apparatus 400 further comprises a second photo-detector 218 for detecting the backscattered test signal, i.e. which have been backscattered as a result of being transmitted over the optical link as described above, and received and demultiplexed by the demultiplexing module 213. The second photo-detector 213 may be time gated, for example to correspond with the timing used to time interleave the test signal with the AMCC signal in the first place.

A low pass filter, LPF, 220 may be provided after the second photo-detector 218, i.e. after the photodetector that should receive the backscattered test signals, which is adapted to block the backscattered data signals on higher frequencies and let through only backscattered signals relating to the time-interleaved AMCC/test signal which needs to be demultiplexed.

From the above it can be seen that the transmission of the time-interleaved test/AMCC signal requires rather minor changes on the electronic side of the transceiver apparatus with respect to an AMCC-enabled transceiver, i.e. requires a tunable local oscillator to frequency sweep the carrier frequency of the AMCC signal to produce the test signal, and a time-gating mechanism for detecting the backscattered test signal (and in some examples a LPF 220).

FIG. 3 also shows an example of a transceiver apparatus 500 coupled to a remote end of the optical link 111, and how the transceiver apparatus 500 may be adapted to cope with receiving an AMCC signal which has been time-interleaved with a test signal.

The transceiver apparatus 500 comprises a receiving node 313 for receiving the combined signal from the signal combiner 201 of the transmitter side. The time-interleaved signal (that comprises the AMCC signal and the test signal, or at least the remnants of the test signal which have not been backscattered as described above) is received, for example, by the same photo-detector 307 that is provided for detecting the combined one or more downstream data signals.

The transceiver apparatus 300 comprises a signal splitter 314 that is coupled to receive an output of the photo-detector 307, and split the one or more data signals from the time-interleaved signal, to provide the one or more downstream data signals $325_1$ to $325_N$. In the example of FIG. 3 the data signals are high pass filtered after the signal splitter 314, using high pass filters $315_1$ to $315_N$.

The example of FIG. 3 shows the transceiver apparatus 500 comprising a mixer 317 comprising a local oscillator for obtaining the AMCC signal 326 received by the transceiver apparatus 500.

As with the embodiment of FIG. 2, the transceiver apparatus 500 further comprises a signal combiner 301 that is adapted to combine one or more data signals $305_1$ to $305_N$ that are to be transmitted over the optical link 111, which are to be received as upstream data signals by the first transceiver apparatus 400. In this example one or more mixers $303_1$ to $303_N$ are provided for converting the upstream data signals from baseband to intermediate frequency, IF, signals. A light source 302, for example comprising a single laser, is provided for transmitting the combined signal from the signal combiner 301 over the optical link. In this example the second transceiver apparatus 300 is not shown as transmitting an AMCC signal. It is noted, however, that the second transceiver apparatus 500 may be adapted to transmit such an AMCC signal, in a similar way to the first transceiver apparatus 400, in which case the signal combiner 301 of the second transceiver apparatus 500 may be adapted to also combine the AMCC signal with the upstream data signals $305_1$ to $305_N$.

In a similar way, although FIG. 3 does not show how the first transceiver apparatus 400 receives AMCC signals from other transceivers, the first transceiver apparatus 400 may also comprise circuitry similar to the second transceiver apparatus 500, for extracting a received AMCC signal from a time-interleaved signal comprising a test signal and the AMCC signal. Such an embodiment would enable the optical link to be tested from both sides, which could provide additional information about the line under test.

As such, the method performed in the transceiver apparatus 200 and/or 300 of FIG. 2 and/or the transceiver apparatus 400 and/or 500 of FIG. 3, may further comprise receiving a time-interleaved signal over the optical link from another transceiver apparatus, wherein the time-interleaved signal is received with one or more data signals from the other transceiver apparatus, and wherein the time-interleaved signal comprises a test signal and an auxiliary management and control channel, AMCC, signal. The method may comprise splitting the time interleaved signal from the one or more data signals, and extracting the AMCC signal from the time-interleaved signal to obtain the AMCC signal. In some examples, extracting the AMCC signal comprises demultiplexing the AMCC signal from a time division multiplexed time-interleaved signal, or down-converting the received time-interleaved signal from an intermediate frequency signal to a baseband signal to extract the AMCC signal.

Figure 4:
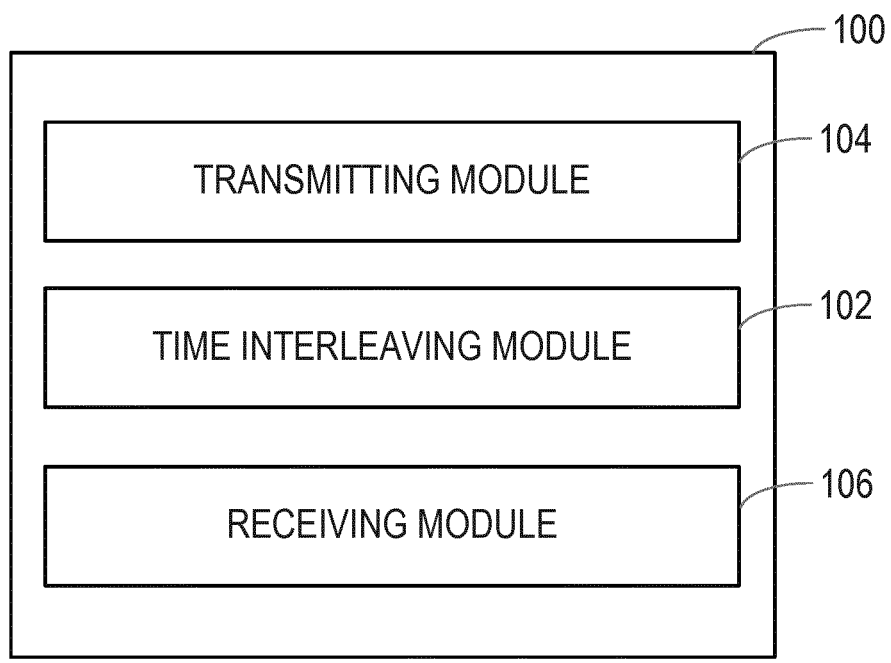
FIG. 4 shows an example of a transceiver apparatus according to a further embodiment.

FIG. 4 shows a transceiver apparatus 100 according to another embodiment, for monitoring an optical link over which one or more data signals are to be transmitted. The transceiver apparatus 100 comprises a time interleaving module 102 for time interleaving a test signal with an auxiliary management and control channel, AMCC, signal to form a time-interleaved signal. The transceiver apparatus comprises a transmitting module 104 for transmitting the time-interleaved signal with one or more downstream data signals over the optical link. The transceiver apparatus 100 comprises a receiving module 106 for receiving a backscattered test signal to monitor the optical link.

In one embodiment, wherein the test signal comprises optical time domain reflectometer, OTDR, pulses, the transceiver apparatus 100 may further comprises a time division multiplexer (not shown) for time division multiplexing the test signal with the AMCC signal to form the time-interleaved signal.

In some examples of such an embodiment, the time division multiplexer is adapted to time interleave single OTDR pulses with the AMCC signal, or time interleave a plurality of OTDR pulses with the AMCC signal, or time interleave a coded bit sequence of OTDR pulses with the AMCC signal.

In another embodiment, wherein the test signal comprises an optical frequency domain reflectometer, OFDR, signal, the transceiver apparatus 100 comprises a frequency sweeping module (not shown) for frequency sweeping the OFDR signal between a first frequency and a second frequency to generate the test signal.

A center frequency of the OFDR signal may correspond to the center frequency of a carrier signal of the AMCC signal, wherein the frequency sweeping module is adapted to frequency sweep the OFDR signal between the first frequency and the second frequency within a frequency range used for the AMCC signal.

In some examples of such an embodiment, the transmitting module 104 is adapted to halt transmission of the AMCC signal while the OFDR signal is being frequency swept to generate the test signal, and in some aspects, and in some aspects, vice versa.

The transceiver apparatus 100 may comprise a time gated photo-detector (not shown) for receiving the backscattered test signal, to detect the backscattered test signal from the optical link.

In some embodiments, the transceiver apparatus 100 may be adapted to receive a time-interleaved signal over the optical link from another transceiver apparatus, wherein the time-interleaved signal is received with one or more data signals from the other transceiver apparatus, and wherein the time-interleaved signal comprises a test signal and an auxiliary management and control channel, AMCC, signal. The transceiver apparatus 100 may therefore comprise a splitting module (not shown) for splitting the time interleaved signal from the one or more data signals, and an extracting module (not shown) for extracting the AMCC signal from the time-interleaved signal to obtain the AMCC signal. The extracting module may be adapted to demultiplex the AMCC signal from a time division multiplexed time-interleaved signal, or down-convert the received time-interleaved signal from an intermediate frequency signal to a baseband signal to extract the AMCC signal.

A benefit of integrating multiple functions into a single transmitter part of a transceiver apparatus, instead of devoting individual subsystems to each function is, naturally, the reduction of hardware and footprint as well related costs and energy consumption.

By selecting the choice of certain parameters, such as the modulation index for AMCC/Line monitoring, this can limit the impact on the data signal itself to a negligible level, while providing sufficient power budget for link monitoring and AMCC communication. For example, if the total modulation index is 100%, one can distribute it across all data signals and AMCC/test signal e.g. assigning 10% to each of these signals assuming there would be 9 data signals and 1 AMCC/test signal. This is achieved by properly setting the RF power of all those signals at the input of the laser. For a-MFH it is preferable that the total RF power does not exceed the linearity regime of the transmitter in order to avoid signal quality degradation, (d-MFH being more robust to this due to other data receiver circuitry). The absolute value of the RF power will depend on the particular laser used in a particular application.

According to a further aspect it is noted that, since the AMCC communication is bidirectional, this enables Double-Ended Line Testing (DELT) to be implemented using the same approach as described in the embodiments above. Such an embodiment can use, for example, two different optical carriers for counter-propagating channels, which may be beneficial for enriching the line monitoring and testing results.

In the embodiments described above, it is noted that the exact implementations of the TDM multiplexing modules (at the transmitter side), TDM demultiplexing modules (at the receiver side) and the photo-detector time-gating (at the transmitter side) are out of the scope of this document.

The embodiments described above provide AMCC and line testing signals within the same electrical band through time-slotting and imposing this onto an optical carrier commonly used for data transmission through low-modulation index.

The embodiments described herein take advantage of the spectral similarities that exist between baseband pulse-based monitoring and the baseband over-modulated AMCC, as well as the spectral similarity between low frequency/high frequency tone-based monitoring and the RF pilot-tone of AMCC, which enable the AMCC and the test signals (or line monitoring signals) to coexist.

As described above, such coexistence of optical link monitoring (e.g. fiber monitoring) and AMCC is achieved through time-slotting of the OTDR pulses with AMCC bits or time-slotting of a frequency-swept OFDR and fixed-frequency AMCC.

The embodiments described herein have an advantage of embedding a monitoring functionality within an optical transmitter. This has the further advantage of enabling a single optical wavelength channel (and, therefore, a single light source) to perform data transmission and reflectometry-based link monitoring.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a transceiver apparatus for monitoring an optical link over which one or more data signals are to be transmitted, the method comprising:
   time interleaving a test signal with an auxiliary management and control channel, AMCC, signal to form a time-interleaved signal, wherein the test signal comprises optical time domain reflectometer, OTDR, pulses or an optical frequency domain reflectometer, OFDR, signal;
   transmitting the time-interleaved signal with one or more downstream data signals over the optical link; and
   receiving a backscattered test signal to monitor the optical link.

2. A method as claimed in claim 1, comprising time division multiplexing the test signal with the AMCC signal to form the time-interleaved signal.

3. A method as claimed in claim 1, comprising:
   time interleaving single optical time domain reflectometer, OTDR, pulses with the AMCC signal; or
   time interleaving a plurality of OTDR pulses with the AMCC signal; or
   time interleaving a coded bit sequence of OTDR pulses with the AMCC signal.

4. A method as claimed in claim 1, wherein the time-interleaved signal comprising the test signal and AMCC signal is a baseband signal, and wherein the one or more downstream data signals are intermediate frequency signals.

5. A method as claimed claim 1, comprising frequency sweeping the test signal between a first frequency and a second frequency to generate the test signal.

6. A method as claimed in claim 5, wherein transmission of the AMCC signal is halted while the test signal is being frequency swept to generate the test signal.

7. A method as claimed in claim 6, comprising buffering the AMCC signal while the test signal is being frequency swept to generate the test signal.

8. A method as claimed in claim 1, wherein a center frequency of the test signal corresponds to the center frequency of a carrier signal of the AMCC signal.

9. A method as claimed in claim 1, wherein the test signal is frequency swept between the first frequency and the second frequency within a frequency range used for the AMCC signal.

10. A method as claimed in claim 1, wherein receiving the backscattered test signal comprises using a time gated photo-detector to detect the backscattered test signal from the optical link.

11. A method as claimed in claim 10, wherein the time-gated photo-detector is separate from a photodetector used to monitor upstream data signals received at the transceiver from another transceiver coupled to a remote side of the optical link.

12. A method as claimed in claim 1, further comprising:
receiving a time-interleaved signal over the optical link from another transceiver apparatus, wherein the time-interleaved signal is received with one or more data signals from the other transceiver apparatus, and wherein the time-interleaved signal comprises a test signal and an auxiliary management and control channel, AMCC, signal;
splitting the time interleaved signal from the one or more data signals; and
extracting the AMCC signal from the time-interleaved signal to obtain the AMCC signal.

13. A method as claimed in claim 12, wherein extracting the AMCC signal comprises:
demultiplexing the AMCC signal from a time division multiplexed time-interleaved signal; or
down-converting the received time-interleaved signal from an intermediate frequency signal to a baseband signal to extract the AMCC signal.

14. A transceiver apparatus for monitoring an optical link over which one or more data signals are to be transmitted, the transceiver apparatus comprising:
a time interleaving module for time interleaving a test signal with an auxiliary management and control channel, AMCC, signal to form a time-interleaved signal, wherein the test signal comprises optical time domain reflectometer, OTDR, pulses or an optical frequency domain reflectometer, OFDR, signal;
a transmitting module for transmitting the time-interleaved signal with one or more downstream data signals over the optical link; and
a receiving module for receiving a backscattered test signal to monitor the optical link.

15. A transceiver apparatus as claimed in claim 14, wherein the apparatus comprises:
a time division multiplexer for time division multiplexing the test signal with the AMCC signal to form the time-interleaved signal.

16. A transceiver apparatus as claimed in claim 15, wherein the time division multiplexer is adapted to:
time interleave single OTDR pulses with the AMCC signal; or
time interleave a plurality of OTDR pulses with the AMCC signal; or
time interleave a coded bit sequence of OTDR pulses with the AMCC signal.

17. A transceiver apparatus as claimed in claim 14, wherein the apparatus comprises:
a frequency sweeping module for frequency sweeping the test signal between a first frequency and a second frequency to generate the test signal.

18. A transceiver apparatus as claimed in claim 17, wherein a center frequency of the test signal corresponds to the center frequency of a carrier signal of the AMCC signal, and wherein the frequency sweeping module is adapted to frequency sweep the test signal between the first frequency and the second frequency within a frequency range used for the AMCC signal.

19. A transceiver apparatus as claimed in claim 17, wherein the transmitting module is adapted to halt transmission of the AMCC signal while the test signal is being frequency swept to generate the test signal, and vice versa.

20. A transceiver apparatus as claimed in claim 14, comprising a time gated photo-detector for receiving the backscattered test signal, to detect the backscattered test signal from the optical link.

21. A transceiver apparatus as claimed in claim 14, which is adapted to receive a time-interleaved signal over the optical link from another transceiver apparatus, wherein the time-interleaved signal is received with one or more data signals from the other transceiver apparatus, and wherein the time-interleaved signal comprises a test signal and an auxiliary management and control channel, AMCC, signal, the transceiver apparatus comprising:
a splitting module for splitting the time interleaved signal from the one or more data signals; and
an extracting module for extracting the AMCC signal from the time-interleaved signal to obtain the AMCC signal.

22. A transceiver apparatus as claimed in claim 21, wherein the extracting module is adapted to:
demultiplex the AMCC signal from a time division multiplexed time-interleaved signal; or
down-convert the received time-interleaved signal from an intermediate frequency signal to a baseband signal to extract the AMCC signal.

* * * * *